(12) United States Patent
Bowron et al.

(10) Patent No.: US 6,205,271 B1
(45) Date of Patent: Mar. 20, 2001

(54) OPTICAL INTEGRATOR ROD

(75) Inventors: John Bowron, Waterloo; Terry Schmidt, Wellesley, both of (CA)

(73) Assignee: Christie Digital Systems, Inc., Ontario (CA)

( * ) Notice: Subject to any disclaimer, the term of this patent is extended or adjusted under 35 U.S.C. 154(b) by 0 days.

(21) Appl. No.: 09/396,444

(22) Filed: Sep. 15, 1999

(51) Int. Cl.$^7$ ........................................ G02B 6/26
(52) U.S. Cl. ........................ 385/31; 362/32; 349/61
(58) Field of Search ................................ 359/434, 856; 385/31, 38; 362/32; 349/61, 65

(56) References Cited

U.S. PATENT DOCUMENTS

| | | | |
|---|---|---|---|
| 4,656,562 | * | 4/1987 | Sugino ................................ 362/32 |
| 4,918,583 | * | 4/1990 | Kudo et al. ....................... 362/268 |
| 5,296,892 | * | 3/1994 | Mori .................................... 355/67 |
| 5,748,288 | * | 5/1998 | Nagano et al. ..................... 355/53 |
| 6,005,722 | * | 12/1999 | Butterworth et al. ............. 359/712 |

* cited by examiner

Primary Examiner—Cassandra Spyrou
Assistant Examiner—Mark A. Robinson
(74) Attorney, Agent, or Firm—Staas & Halsey LLP

(57) ABSTRACT

An optical integrator, comprising a solid integrator rod for internally reflecting light from an illumination source and transmitting the reflected light through an exit face thereof as a rectangular beam according to a predetermined aspect ratio, and a rectangular precision metal aperture with mirrored wall surfaces for extending the focal plane of the solid integrator rod beyond the exit face.

6 Claims, 3 Drawing Sheets

OPTICAL INTEGRATOR ROD

FIELD OF THE INVENTION

The present invention relates in general to flat panel display systems, and more particularly to an improved optical integrator for use with LCDs and other display related illumination systems.

BACKGROUND OF THE INVENTION

Optical integrator rods are well known components used primarily in illumination systems for electronic projectors. An optical integrator rod is a hollow, or solid internally reflective "light pipe" which uses multiple reflections of a focused light source to obtain homogenization of round or irregular patterns of illumination and convert them into a uniform rectangular pattern. This pattern can be imaged onto a panel such as an LCD (Liquid Crystal Display) or DMD (Digital Micromirror Device) by a relay lens system and then projected to a screen. Thus, the optical integrator rod is used to improve uniformity and efficiently match the aspect ratio of the illumination source to the panel.

There are two basic types of reflective integrators: a "tunnel" type made of four mirrors, and a solid glass integrator or "solid rod integrator". This latter type is more efficient than the former since it works on lossless multiple reflections using TIR (the Total Internal Reflection) of the glass rod.

As a practical measure adopted to improve handling and reduce chips in the glass, opticians normally require a chamfer on the sharp edges of the glass rod. This chamfer (or the micro chips that result if the chamfer is absent) are imaged onto the panel and may show up as defects on the edges of the final image. To prevent this, the state of the art is to either over fill the panel or provide a thin output aperture plate over the end of the rod that is smaller than the glass. This precision plate guarantees dimensional accuracy, and sharp corners, but because it masks the defects and chamfers, it is necessarily smaller than the output face, and therefore restricts some of the illumination. This figure often amounts to about 10% of the useable light.

In order to improve efficiency and brightness, prior art optical integrator rods require an output face that presents a clear, sharp and unobstructed illumination to be imaged onto the panel by the relay lens. Because the focus of the relay lens must be sharp at the aperture for efficiency, it is also often sharp enough to pick up dust and defects at the focal point (e.g. glass defects and particles on the glass output face). A common solution to this problem is to move the aperture plate out a small distance, in order to ensure that the depth of focus of the lens does not focus the dust or defects onto the panel and the projection screen. However, this solution further exacerbates the problem of decreased efficiency and light output resulting from use of a precision aperture.

SUMMARY OF THE INVENTION

According to the present invention, an improved optical integrator rod structure is provided wherein the exit face of a solid glass integrator rod is extended using a precision metal aperture with mirrored wall surfaces, and sharp unblemished edges extending back to the solid light pipe integrator. By using mirrored wall surfaces to extend the aperture, high optical efficiency is maintained through reflection, and the object plane becomes displaced into the adjacent air (i.e. not on the glass end of the integrator rod). This allows some edge chips, chamfers, and minor glass defects to be present, thereby increasing yield, and yet not be imaged sharply onto the active viewing area of the panel so as to obscure pixel information. By attaching a short hollow tunnel to a longer solid rod, all of the benefits of a solid rod are combined with the benefits of a hollow tunnel, with none of the deficiencies of either.

BRIEF DESCRIPTION OF THE DRAWINGS

A detailed description of the preferred embodiment is provided herein below with reference to the following drawings, in which.

DETAILED DESCRIPTION OF THE INVENTION

Figure 1A:
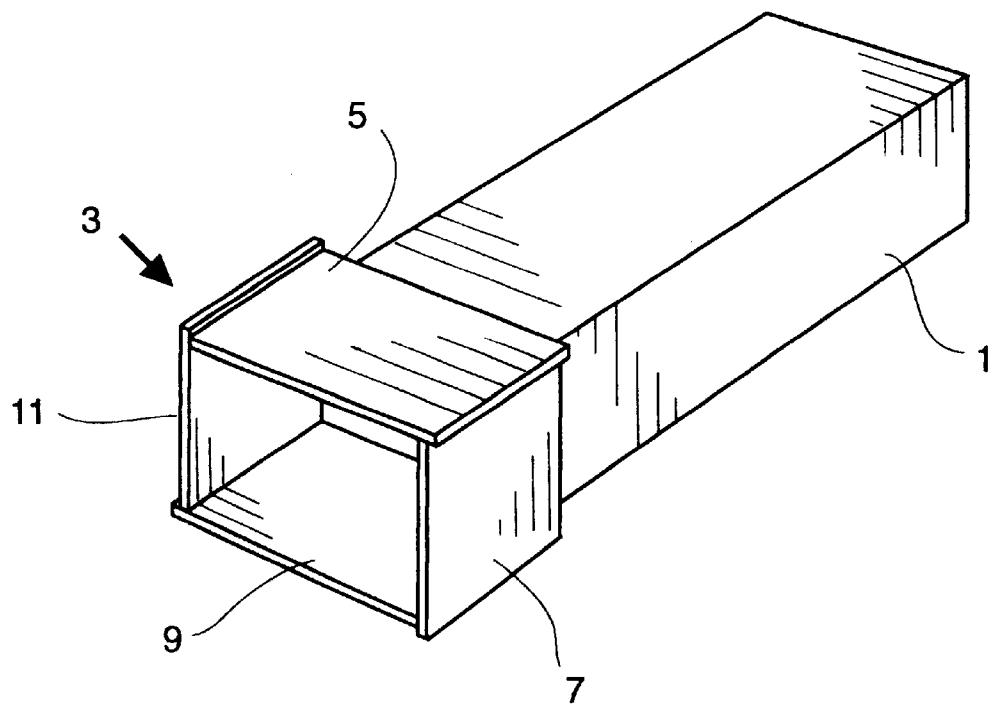
FIGS. 1A and 1B are perspective and end views, respectively, of an improved optical integrator rod according to the present invention.
Figure 1B:
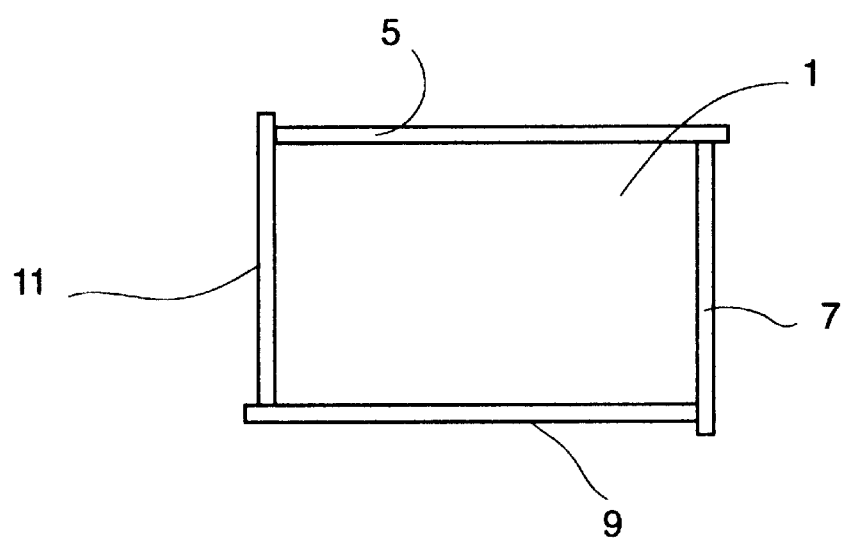

Turning to FIGS. 1A and 1B, an optical integrator rod 1 is shown having an exit face which is extended using a precision metal aperture 3 with mirrored wall surfaces. According to the method of construction for the embodiment of FIG. 1, four pieces of mirrored metal 5, 7, 9 and 11, (or front surface mirrors) are cemented to the sides of the integrator rod 1. The edges of the mirrored sheet metal facing the relay lens are lapped so as to be smooth and burr free. The metal sheets, or mirrors 5, 7, 9 and 11 are then precisely aligned to form a chip free aperture which is the same size as the exit end of the glass integrator 1.

One drawback of the embodiment shown in FIG. 1, is that there are some losses of TIR (Total Internal Reflection) at the glue line. Also, the precise lapping of the aperture surface to achieve no nicks, burrs or defects. Aperture size is variable depending on the specific dimensions of the glass rod.

Figure 2A:
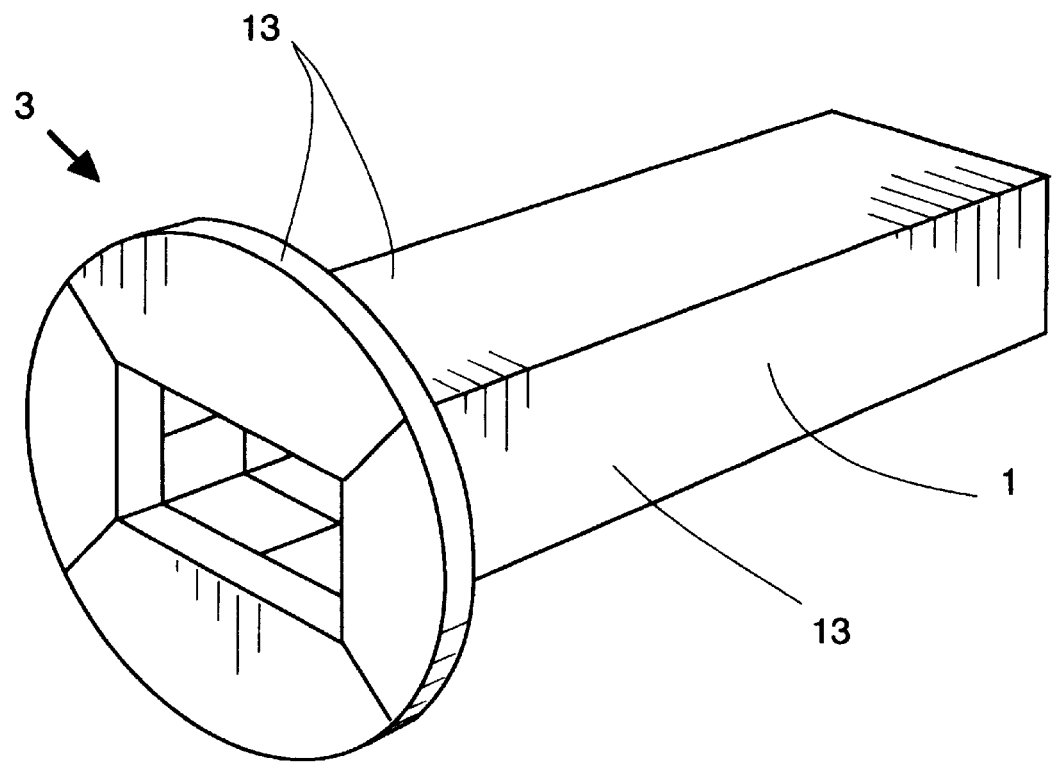
FIGS. 2A and 2B are perspective and cross-sectional views, respectively, of an improved optical integrator rod according a first alternative embodiment of the present invention.
Figure 2B:
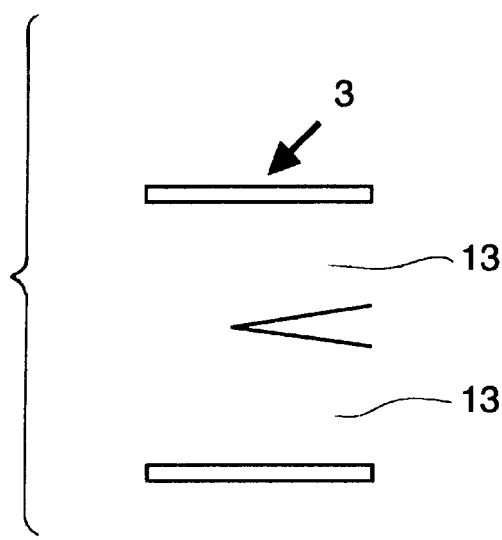
Figure 3A:
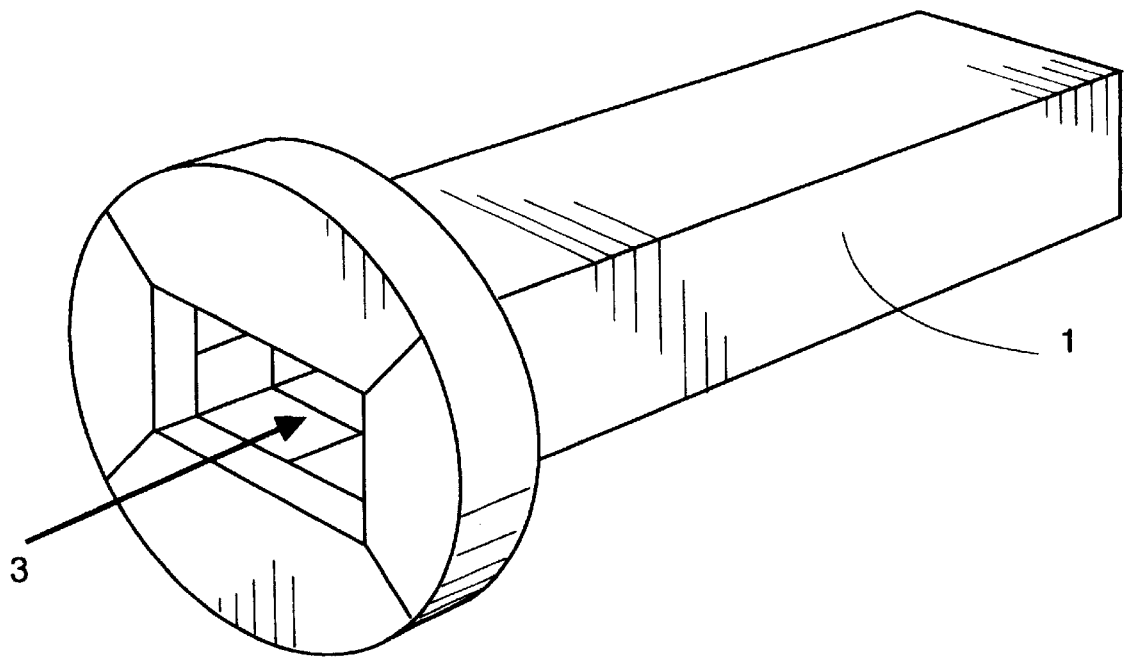
FIGS. 3A and 3B are perspective and end views, respectively, of an improved optical integrator rod according a second alternative embodiment of the present invention.

These drawbacks are overcome by the embodiments of FIGS. 2 and 3. In FIGS. 2A and 2B a flexible small thin metal end cap 3 is replicated from a tool via nickel electroforming. The end cap 3 is affixed to the end of the solid glass rod 1 integrator via slotted thin metal wings 13 which take up the tolerance of the glass rod 1 (and optionally also via spring clips).

Figure 3B:
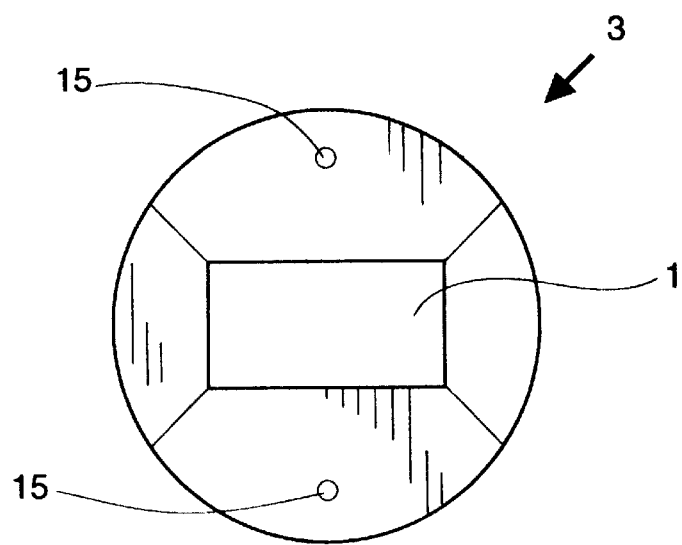

A further embodiment is shown in FIG. 3 comprising a two piece diamond machined aluminum frame 3 which is mechanically screwed together over the end face of the optical rod integrator 1. Mounting holes are shown in FIG. 3B for mounting the entire structure into an illumination system such as a projector.

Other embodiments and variations of the invention are possible. In general, according to the present invention, a hollow reflective pipe forms an extension to the end of a solid optical integrator rod. There are many ways in which this general inventive concept may be reduced to practice, all of which are intended to be encompassed by the present invention. More specifically, whereas the preferred embodiment sets for the use of a rectangular hollow tunnel, other cross-sectional shapes may be used to equal advantage. Furthermore, although the preferred application of the present invention, as set forth herein, is illumination of LCD/DMD panels, other general illumination applications are contemplated. All such embodiments and variations are believed to be within the sphere and scope of the invention as defined by the claims appended hereto.

What is claimed is:

1. An optical integrator, comprising:
   a) a solid integrator rod for internally reflecting light from a rectangular illumination source and transmitting said light through a rectangular exit face thereof as a rectangular beam according to a predetermined aspect ratio; and
   b) a hollow tunnel with planar interior mirrored wall surfaces for extending the rectangular exit face of said solid integrator rod to a focal plane in air which is beyond the rectangular exit face of the solid integrator rod.

2. The optical integrator of claim 1, wherein said mirrored wall surfaces are comprised of lapped sheets of metal.

3. The optical integrator of claim 1, wherein said mirrored wall surfaces are comprised of front surface glass mirrors.

4. The optical integrator of claim 1, wherein said mirrored wall surfaces are diamond cut mirrored reflective surfaces.

5. An optical integrator, comprising:
   a solid integrator rod for internally reflecting light from an illumination source and transmitting the light through an exit face thereof as a rectangular beam according to a predetermined aspect ratio; and
   a hollow tunnel with interior mirrored wall surfaces for extending the exit face of said solid integrator rod to a focal plane in air which is beyond the exit face of the solid integrator rod, said hollow tunnel including a precision thin metal end cap having a rectangular portion with electroformed internally reflective surfaces extending beyond the exit face and a plurality of slotted wings which fit over said solid integrator rod.

6. An optical integrator, comprising:
   a solid integrator rod for internally reflecting light from an illumination source and transmitting the light through an exit face thereof as a rectangular beam according to a predetermined aspect ratio; and
   a hollow tunnel with interior mirrored wall surfaces for extending the exit face of said solid integrator rod to a focal plane in air which is beyond the exit face of the solid integrator rod, said hollow tunnel including a precision two-part aluminum frame screwed together over said solid integrator rod so as to extend beyond the exit face.

* * * * *